US012147138B2

(12) United States Patent
Uchida et al.

(10) Patent No.: US 12,147,138 B2
(45) Date of Patent: Nov. 19, 2024

(54) ACTIVE MATRIX SUBSTRATE, LIQUID CRYSTAL DISPLAY DEVICE, AND METHOD FOR MANUFACTURING ACTIVE MATRIX SUBSTRATE

(71) Applicant: Sharp Display Technology Corporation, Kameyama (JP)

(72) Inventors: Seiichi Uchida, Kameyama (JP); Kiyoshi Minoura, Kameyama (JP); Kuniaki Okada, Kameyama (JP); Hiromi Katoh, Kameyama (JP); Keisuke Yoshida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/197,014

(22) Filed: May 12, 2023

(65) Prior Publication Data

US 2023/0375889 A1     Nov. 23, 2023

(30) Foreign Application Priority Data

May 17, 2022   (JP) ................................. 2022-080584

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136222* (2021.01); *G02F 1/136227* (2013.01)

(58) Field of Classification Search
CPC ......... G02F 1/136227; G02F 1/136222; G02F 1/133514
See application file for complete search history.

(56) References Cited

U.S. PATENT DOCUMENTS

| | | | |
|---|---|---|---|
| 2004/0195573 A1* | 10/2004 | Kim ...................... | H01L 27/124 257/E27.111 |
| 2017/0271384 A1* | 9/2017 | Zheng ............... | H01L 27/14623 |
| 2020/0064964 A1* | 2/2020 | Lee ...................... | G02F 1/13338 |
| 2020/0285090 A1* | 9/2020 | Tanaka .................. | G02F 1/1368 |
| 2022/0163857 A1* | 5/2022 | Watanabe ......... | G02F 1/136227 |
| 2022/0326581 A1* | 10/2022 | Kimura ............. | G02F 1/134363 |
| 2022/0373846 A1* | 11/2022 | Kimura ............. | G02F 1/136222 |

FOREIGN PATENT DOCUMENTS

JP    2021-135387 A    9/2021

\* cited by examiner

*Primary Examiner* — Jonathan Y Jung
(74) *Attorney, Agent, or Firm* — ScienBiziP, P.C.

(57) ABSTRACT

An active matrix substrate includes a substrate that is transparent, and a plurality of pixels positioned on the substrate. Each pixel includes a thin-film transistor (TFT) positioned on the substrate, a first color filter layer disposed on the substrate so as to cover the TFT, a contact hole being provided in the first color filter layer, a pixel electrode that is positioned on a bottom face and a side face of the contact hole, and on the first color filter layer, and that is electrically connected to the TFT via the contact hole, and a second color filter layer disposed within the contact hole.

16 Claims, 14 Drawing Sheets

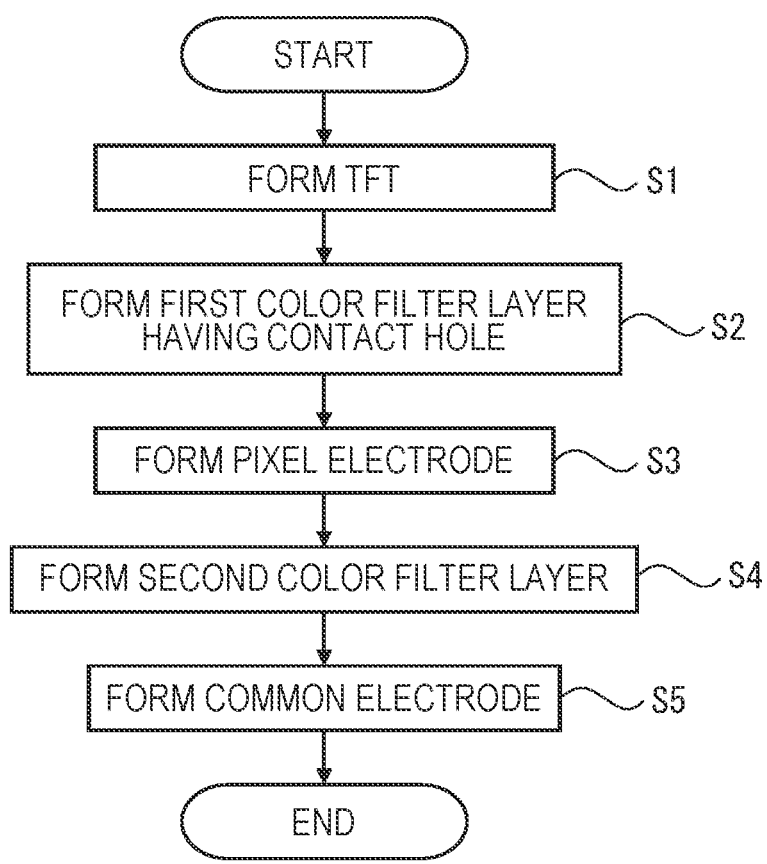

ACTIVE MATRIX SUBSTRATE, LIQUID CRYSTAL DISPLAY DEVICE, AND METHOD FOR MANUFACTURING ACTIVE MATRIX SUBSTRATE

BACKGROUND

1. Field

The present disclosure relates to an active matrix substrate, a liquid crystal display device, and a method for manufacturing an active matrix substrate.

2. Description of the Related Art

Liquid crystal display devices are in widespread use in various fields, and liquid crystal display devices having structures in accordance with usages thereof are being developed. High-resolution (high-definition) liquid crystal display devices have a small pixel pitch, and accordingly positioning a color filter disposed on a counter substrate and pixels on an active matrix substrate with high precision is an issue. For example, Japanese Unexamined Patent Application Publication No. 2021-135387 discloses a liquid crystal display device that has a color filter on array (COA) structure, in which a color filter is disposed on an active matrix substrate in order to suppress positional deviation between the color filter and the active matrix substrate.

Generally, in high-resolution liquid crystal display devices, smaller pixels mean reduction in pixel aperture ratio as well. It is desirable to provide an active matrix substrate that includes a COA structure and has an improved pixel aperture ratio, a liquid crystal display device, and a method for manufacturing an active matrix substrate.

SUMMARY

According to an aspect of the disclosure, there is provided an active matrix substrate including a substrate that is transparent and a plurality of pixels positioned on the substrate. Each pixel includes a thin-film transistor (TFT) positioned on the substrate, a first color filter layer disposed on the substrate so as to cover the TFT, a contact hole being provided in the first color filter layer, a pixel electrode that is positioned on a bottom face and a side face of the contact hole, and on the first color filter layer, and that is electrically connected to the TFT via the contact hole, and a second color filter layer disposed within the contact hole.

BRIEF DESCRIPTION OF THE DRAWINGS

FIG. 6 is a flowchart showing a method for manufacturing an active matrix substrate;

DESCRIPTION OF THE EMBODIMENTS

Figure 1:
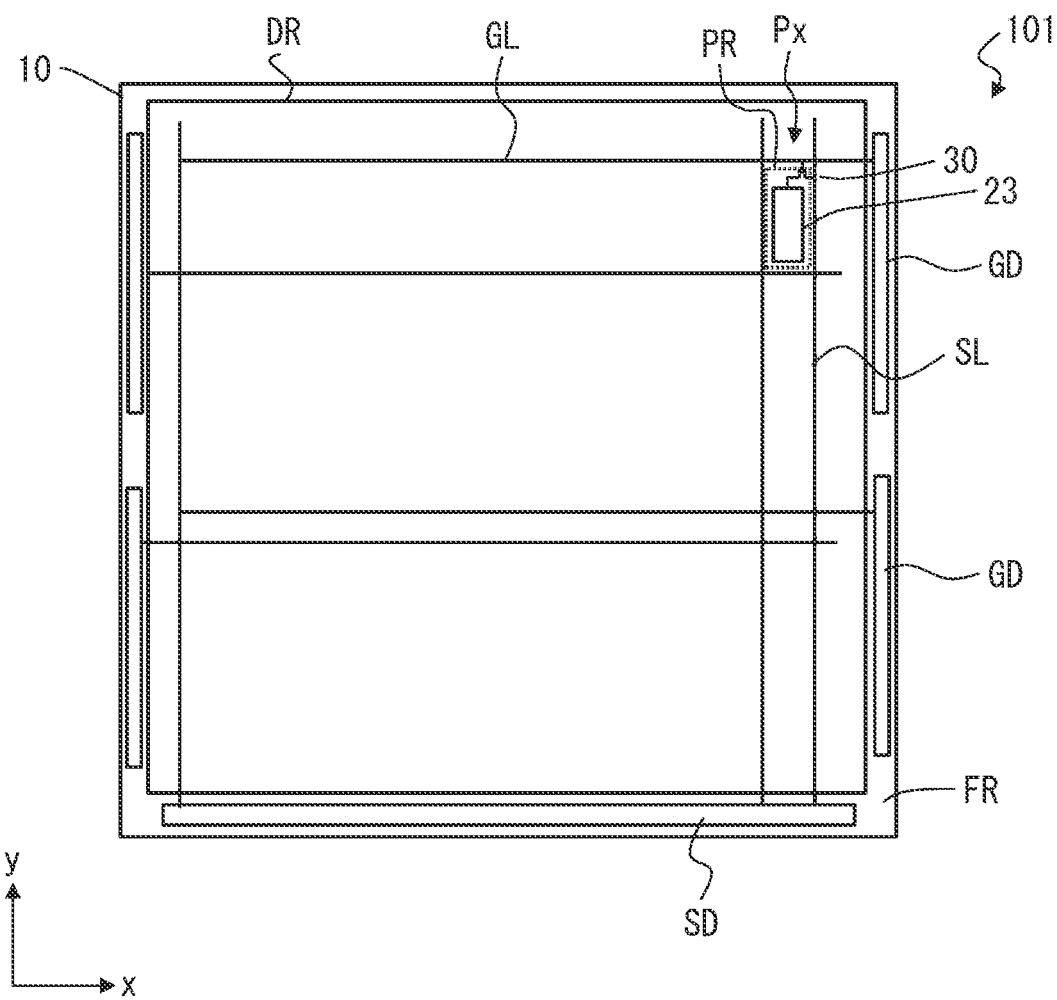
FIG. 1 is a schematic diagram illustrating an example of a planar structure of an active matrix substrate according to a first embodiment.

In a liquid crystal display device having a color filter on array (COA) structure, a contact hole has to be formed in a color filter, and a thin-film transistor (TFT) positioned below the color filter and a pixel electrode positioned on the color filter to be electrically connected. Japanese Unexamined Patent Application Publication No. 2021-135387 discloses viewing contact holes as being regions that do not contribute to formation of images, and accordingly reducing the area of the contact holes and making tapering of the contact holes to be as steep as possible.

In contrast with this, the present inventors have conceived a new active matrix substrate and a new liquid crystal display device that have a structure that enables contact holes to contribute to image formation, and a new method for manufacturing the active matrix substrate.

Embodiments of the present disclosure will be described below with reference to the drawings. The present disclosure is not limited to the following embodiments, and design alterations may be made as appropriate within a scope that fulfills the configuration of the present disclosure. Also, in the following description, parts that are the same or parts that have similar functions may be denoted by the same symbols throughout different drawings, and repetitive description thereof may be omitted. Also, various configurations described in the embodiment and modifications thereof may be combined as appropriate or may be altered without departing from the essence of the present disclosure. In the drawings which will be referenced below, configurations may be simplified or schematized in illustration, and part of configuration members may be omitted, in order to facilitate understanding of the description. Also, the dimensional ratios among the configuration members illustrated in the drawings do not necessarily indicate actual dimensional ratios.

First Embodiment

Figure 2:
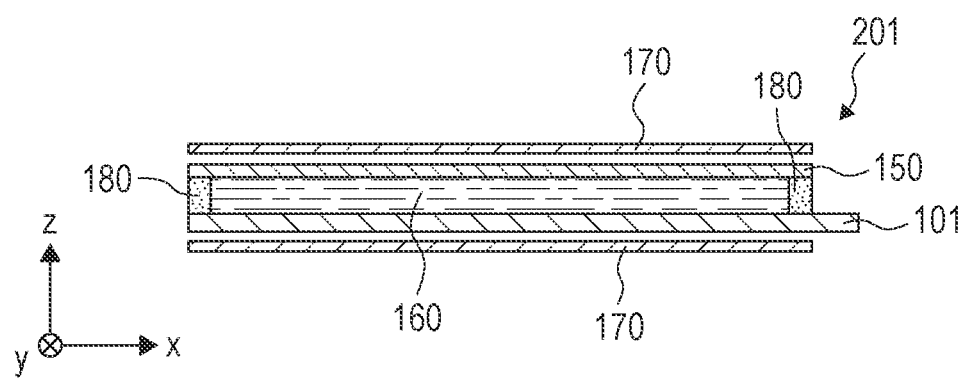
FIG. 2 is a schematic sectional view illustrating a configuration example of a liquid crystal display device according to the first embodiment.
Figure 3:
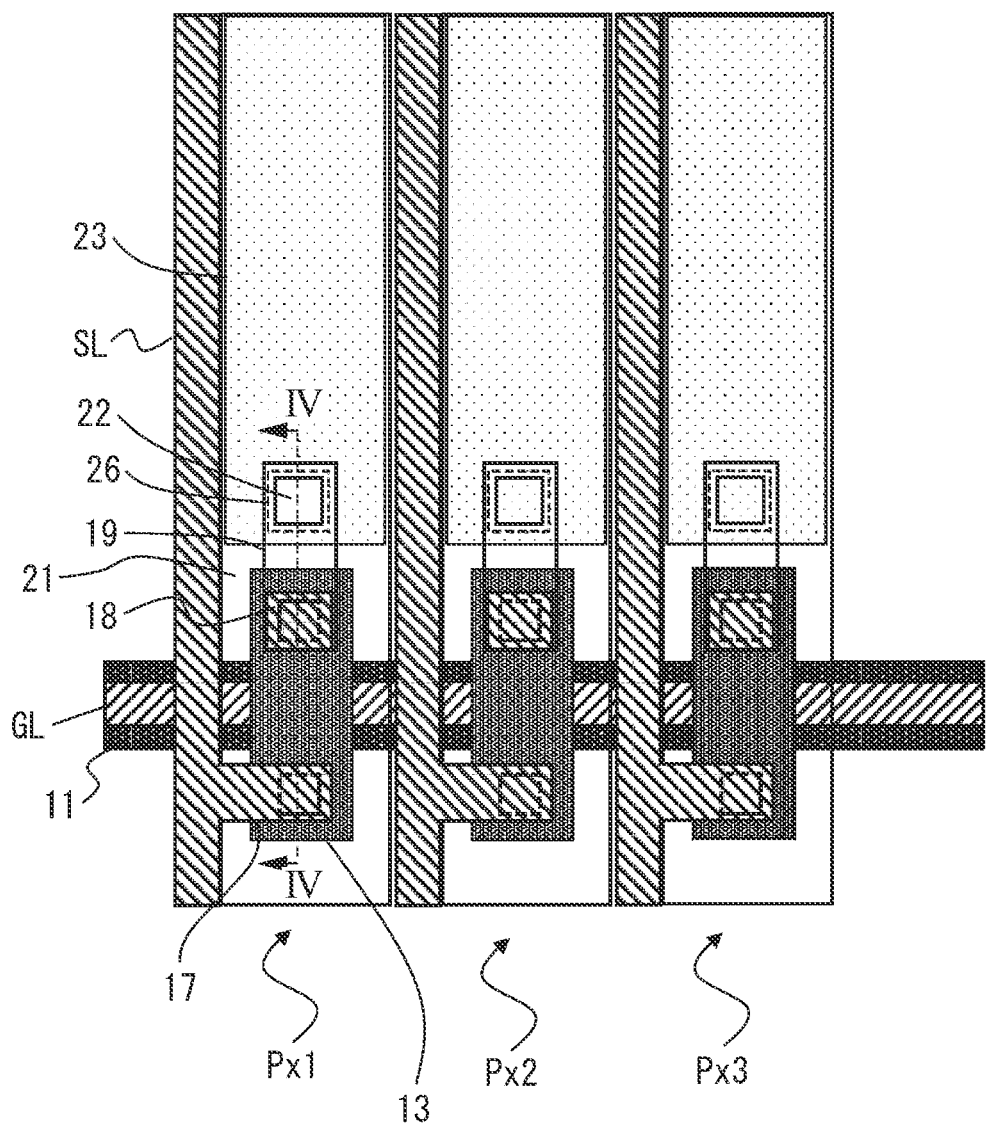
FIG. 3 is a plan view illustrating major components of pixels of the active matrix substrate.
Figure 4:
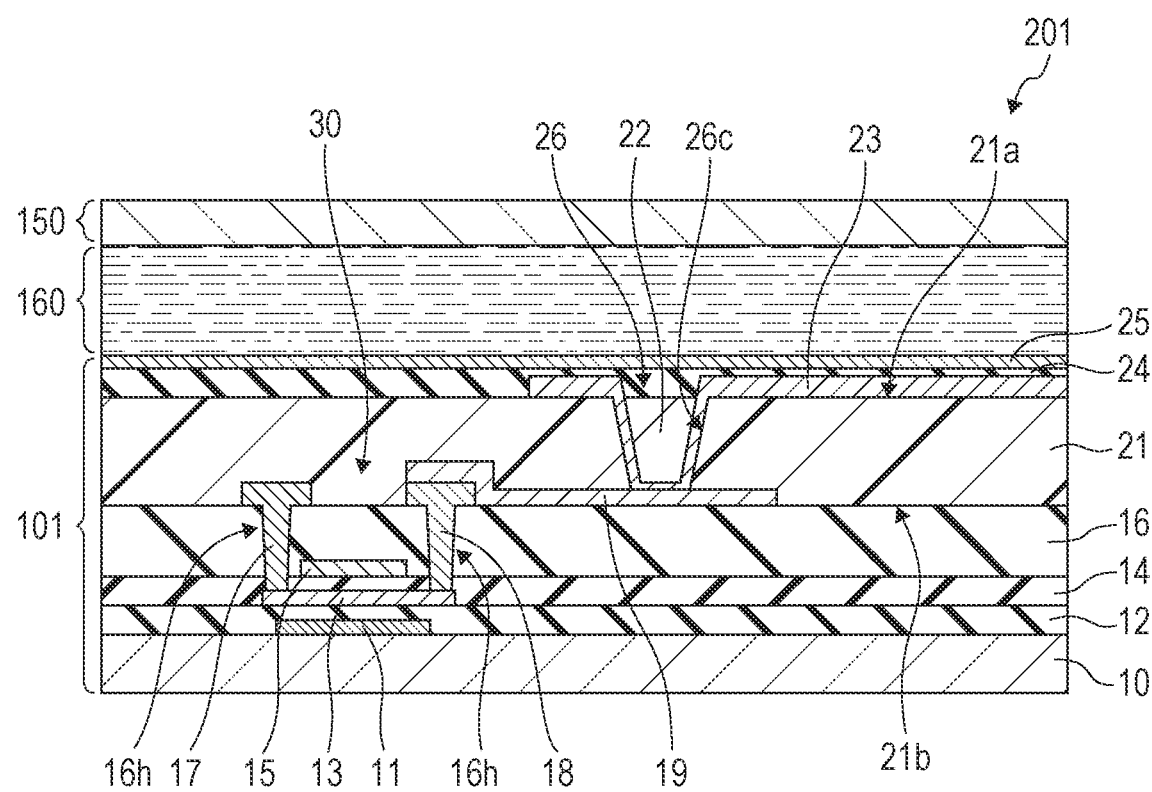
FIG. 4 is a sectional view of the liquid crystal display device taken along line IV-IV in FIG. 3.

FIG. 1 is a schematic diagram illustrating an overall configuration of an active matrix substrate 101 according to a first embodiment, and FIG. 2 is a schematic sectional view of a liquid crystal display device 201 according to the present embodiment. FIG. 3 is a plan view illustrating major components of pixels of the active matrix substrate 101. FIG. 4 is a sectional view of a liquid crystal display device taken along line IV-IV in FIG. 3.

The active matrix substrate 101 includes a substrate 10, and a plurality of pixels Px positioned on the substrate 10. The substrate 10 includes a display region DR and a non-display region FR other than the display region on a principal face thereof. The display region DR includes, for example, a plurality of pixel regions PR that are arrayed in a matrix form in an x-direction (second direction) and a y-direction (first direction) that is orthogonal to the x-direction. The non-display region FR is a region that is positioned on a periphery of the display region, and does not contribute to display.

The active matrix substrate 101 further includes a plurality of source bus lines SL and a plurality of gate bus lines GL. For example, the plurality of source bus lines SL extend in the y-direction, and the plurality of gate bus lines GL extend in the x-direction.

A pixel region PR is a region surrounded by a pair of adjacent source bus lines SL out of the plurality of source bus lines SL and a pair of adjacent gate bus lines GL out of the plurality of gate bus lines GL.

The pixels Px are positioned in the pixel regions PR, and each pixel Px includes a thin-film transistor (TFT) 30 and a pixel electrode 23 electrically connected to the TFT 30. The TFT 30 is also electrically connected to one of the pair of source bus lines SL and one of the pair of gate bus lines GL that surround the pixel region PR.

The active matrix substrate 101 further includes drive circuits that are positioned in the non-display region FR of the substrate 10 and that include a gate driver GD and a source driver SD. Part or all of the drive circuits include TFTs, and may be integrally formed with the substrate 10, or may be configured as packaged integrated circuits (ICs), bare chips, or the like.

The liquid crystal display device 201 includes the active matrix substrate 101, a counter substrate 150, a liquid crystal layer 160, and a pair of polarizing plates 170. The liquid crystal layer 160 is positioned between the active matrix substrate 101 and the counter substrate 150, and is sealed off by a seal 180.

The pair of polarizing plates 170 face each other across at least the liquid crystal layer 160. More specifically, the pair of polarizing plates 170 are positioned so as to sandwich the counter substrate 150, the liquid crystal layer 160, and the active matrix substrate 101. The pair of polarizing plates 170 are disposed in a crossed-Nichols arrangement.

Next, a structure of the active matrix substrate 101 will be described in detail. As described above, the active matrix substrate 101 includes the plurality of pixels Px on the substrate 10. The plurality of pixels Px include a plurality of types of pixels of which transmission bands of a color filter layer differ. In the present embodiment, the plurality of pixels Px may include a first pixel Px1, a second pixel Px2, and a third pixel Px3, adjacent to one another, which will be described in detail later. FIG. 3 illustrates the first pixel Px1, the second pixel Px2, and the third pixel Px3. The first pixel Px1, the second pixel Px2, and the third pixel Px3 each have the same structure, except for the transmission bands of the color filter layer differing. Hereafter, the first pixel Px1, the second pixel Px2, and the third pixel Px3 will be referred to collectively as "pixels Px" when being described together.

Each pixel Px includes a light shielding layer 11, a first insulating layer 12, a gate insulating layer 14, the TFT 30, a second insulating layer 16, a lead-out electrode 19, a first color filter layer 21, a second color filter layer 22, the pixel electrode 23, a third insulating layer 24, a common electrode 25, and a contact hole 26. Also, the TFT 30 includes a semiconductor layer 13, a gate electrode 15, a source electrode 17, and a drain electrode 18.

The substrate 10 is a glass substrate that has transparency, for example. The term "transparency" in the present specification means transmission of light of at least the visible light wavelength band. The light shielding layer 11 is provided on the substrate 10, and the semiconductor layer 13 and the gate bus line GL, which will be described later, are positioned above the light shielding layer 11. The light shielding layer 11 suppresses the situation in which light that has passed through the substrate 10 enters the semiconductor layer 13, and in which electric current is generated by photoelectric conversion or the like. The light shielding layer 11 is made of a metal such as tungsten or the like, for example.

The first insulating layer 12 is formed on the substrate 10, so as to cover the light shielding layer 11. The first insulating layer 12 is made of an inorganic material such as, for example, silicon oxide, silicon nitride, silicon oxynitride, or the like. The light shielding layer 11 may be a single layer made of such an inorganic material, or may be a laminate of two layers or more.

The semiconductor layer 13 of the TFT 30 is positioned on the first insulating layer 12. The semiconductor layer 13 includes an oxide semiconductor layer including at least one element selected from the group consisting of indium (In), gallium (Ga), and zinc (Zn), or a silicon (Si) semiconductor layer. The oxide semiconductor layer and the Si semiconductor layer may include various crystallinities, such as polycrystalline, microcrystalline, c-axis orientated, and so forth.

The gate insulating layer 14 is positioned on the first insulating layer 12, so as to cover the semiconductor layer 13. The gate insulating layer 14 is made of silicon oxide, for example.

The gate bus line GL is positioned on the gate insulating layer 14. As illustrated in FIG. 3, the gate bus line GL is provided at a position that overlays the light shielding layer 11 in plan view. The gate bus line GL overlays the semiconductor layer 13 in plan view. A region of the gate bus line GL that overlays the semiconductor layer 13 is the gate electrode 15 (FIG. 4), and the gate electrode 15 and the semiconductor layer 13 are in contact across the gate insulating layer 14.

The second insulating layer 16 is positioned on the gate insulating layer 14, so as to cover the gate bus line GL. The second insulating layer 16 is made of an inorganic material such as, for example, silicon oxide or the like.

A contact hole 16*h* that exposes part of the semiconductor layer 13 is provided in the second insulating layer 16 and the gate insulating layer 14.

The source electrode 17 and the drain electrode 18 are positioned in the contact hole 16*h* and on the second insulating layer 16. The source electrode 17 and the drain electrode 18 are made of a metal such as titanium (Ti), aluminum (Al), or the like. The source electrode 17 and the drain electrode 18 may be a single layer made of such a metal material, or may be a laminate of two layers or more.

The source bus line SL is also formed on the second insulating layer 16. The source bus line SL is electrically connected to the source electrode 17. In the present embodiment, the source bus line SL and the source electrode 17 are formed integrally.

The lead-out electrode 19 is positioned on the drain electrode 18 and the second insulating layer 16, and is led out outwards from the TFT 30 in plan view. The lead-out electrode 19 is electrically connected to the drain electrode 18 of the TFT 30 by being overlaid on the drain electrode 18. The lead-out electrode 19 is made of a transparent electroconductive material such as, for example, indium tin oxide (ITO) or the like.

The first color filter layer 21 is positioned on the second insulating layer 16 of the substrate 10, so as to cover the TFT 30 and the lead-out electrode 19. The first color filter layer 21 has spectroscopic characteristics of transmitting light of a predetermined wavelength. Specifically, the first color filter layer 21 of the first pixel Px1 transmits light of a first wavelength band, the first color filter layer 21 of the second pixel Px2 transmits light of a second wavelength band, and the first color filter layer 21 of the third pixel Px3 transmits light of a third wavelength band. The first, second, and third wavelength bands may be different from one another.

For example, the first wavelength band is a blue wavelength band, the second wavelength band is a green wavelength band, and the third wavelength band is a red wavelength band. Although the plurality of pixels Px include three types of color filter layers in which the transmission wavelength band differ in the present embodiment, the number of types of pixels is not limited to three, and may be four or more. For example, the plurality of pixels Px may further include a fourth pixel Px4, and the first color filter layer 21 of the fourth pixel Px4 may transmit light of a fourth wavelength band. For example, the fourth wavelength band is yellow.

The contact hole 26 is provided in the first color filter layer 21, passing therethrough in a thickness direction of the first color filter layer 21. The contact hole 26 is positioned on the lead-out electrode 19, and exposes the lead-out electrode 19 at a bottom portion thereof. The first color filter layer 21 may be formed on the entire pixel region. The first color filter layer 21 is made of a photosensitive resin material such as color resist or the like.

There is no particular limitation on shapes of the openings of the contact hole 26 at an upper face 21*a* and a lower face 21*b* of the first color filter layer 21. Although the openings have substantially rectangular shapes in the example illustrated in FIG. 3, the openings may have substantially circular shapes. Also, an inclination angle of a side face 26*c* as to the principal face (lateral direction) of the substrate 10 may be 45° or greater, for example, or may be 45° or smaller. The inclination (taper) of the side face 26*c* may be steep or may be moderate, so long as the inclination angle is such that the pixel electrode 23 which will be described next can be formed without complete line disconnection within the contact hole 26. The contact hole 26 can be a region that also transmits light in the present embodiment, and accordingly a pixel aperture ratio can be maintained at a high level even if the opening on the upper face 21*a* is large, due to the inclination angle of the side face 26*c* being small (moderate).

The pixel electrode 23 is positioned on a bottom face and the side face 26*c* of the contact hole 26, and on the first color filter layer 21. The pixel electrode 23 is electrically connected to the lead-out electrode 19 via the contact hole 26, and further is electrically connected to the TFT 30. The pixel electrode 23 does not cover above the TFT 30 in the present embodiment.

An arrangement may be made in which the pixel electrode 23 does not completely fill inside of the contact hole 26. In other words, an arrangement may be made in which the pixel electrode 23 covers the side face 26*c* of the contact hole 26 with a predetermined thickness, and forms an inner space. The second color filter layer 22 is disposed within the contact hole 26. More specifically, the second color filter layer 22 is disposed in the inner space formed by the pixel electrode 23. The second color filter layer 22 may have the same spectroscopic characteristics as those of the first color filter layer 21 in the same pixel Px. Specifically, the second color filter layer 22 of the first pixel Px1 transmits light of the first wavelength band, the second color filter layer 22 of the second pixel Px2 transmits light of the second wavelength band, and the second color filter layer 22 of the third pixel Px3 transmits light of the third wavelength band. For example, the first wavelength band is the blue wavelength band, the second wavelength band is the green wavelength band, and the third wavelength band is the red wavelength band. The second color filter layer 22 is made of the same material as the first color filter layer 21.

The third insulating layer 24 may be disposed on the pixel electrode 23, the first color filter layer 21, and the second color filter layer 22, so as to cover these. The third insulating layer 24 is made of an inorganic material such as, for example, silicon nitride or the like.

The common electrode 25 may be positioned on the third insulating layer 24. The common electrode 25 is made of a transparent electroconductive material such as, for example, ITO or the like. Alignment films are disposed on the faces of the active matrix substrate 101 and the counter substrate 150 that face the liquid crystal layer 160, although omitted from illustration.

The active matrix substrate 101 and the liquid crystal display device 201 operate in lateral electric field mode under voltage applied across the pixel electrodes 23 and the common electrode 25. Light entering the pixels Px of the active matrix substrate 101 from the substrate 10 side passes through the first color filter layer 21. The second color filter layer 22 having the same spectroscopic characteristics as the first color filter layer 21 is provided in the contact holes 26 formed in the first color filter layer 21, and accordingly the regions of the contact holes 26 can also be made to function as the first color filter layer 21. Thus, the pixel aperture ratio can be increased.

Also, formation of stepped portions in the contact holes 26 can be suppressed by the second color filter layer 22 being positioned within the contact holes 26. Accordingly, stepped portions can be reduced on a surface of the active matrix substrate 101 that comes into contact with the liquid crystal layer 160, and disturbance in alignment of the liquid crystal layer 160 can be reduced.

Figure 5:
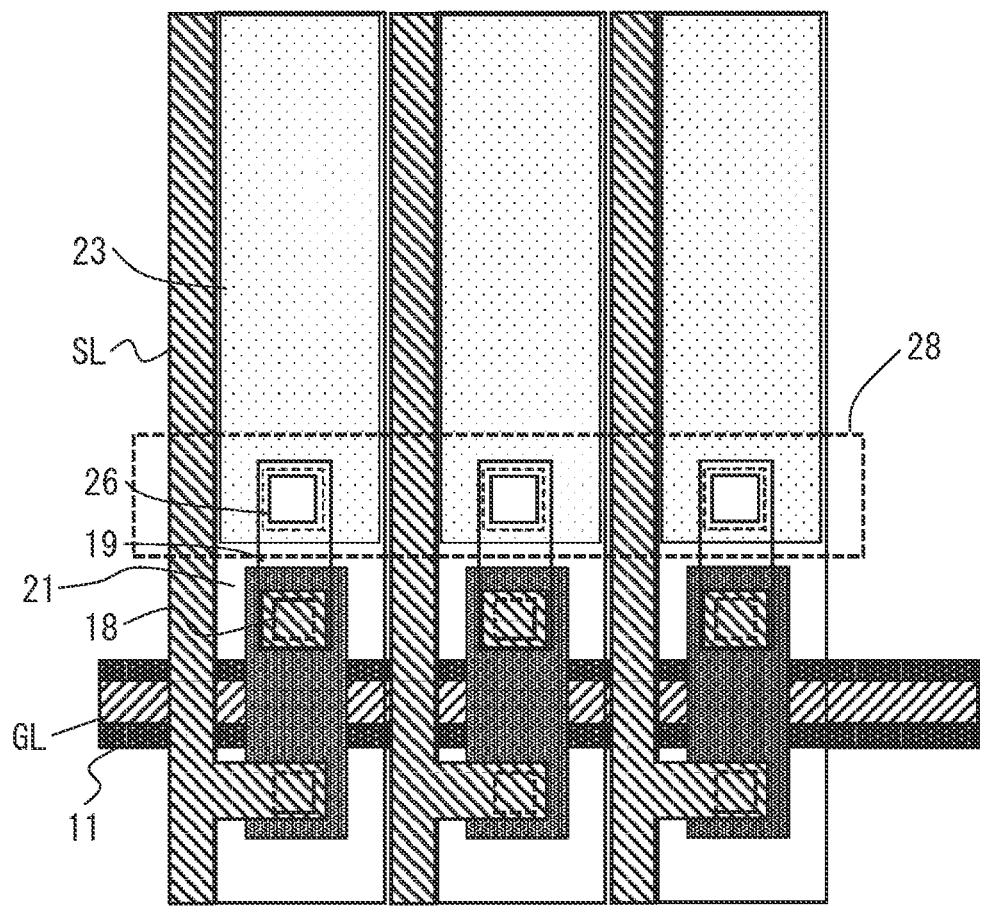
FIG. 5 illustrates a structure of an active matrix substrate according to a reference example, in which no second color filter layer is provided in contact holes.

FIG. 5 illustrates a structure of an active matrix substrate according to a reference example, in which the second color filter layer 22 is not provided in the contact holes 26. In a case in which the second color filter layer 22 is not provided within the contact holes 26, light passing through the contact holes 26 enters the counter substrate 150 as white light without change. That is to say, the light emitted from the first pixel Px1, the second pixel Px2, and the third pixel Px3 is light in which white light is intermingled with the red, blue, and green light, respectively, and accordingly images may not be displayed with a correct shade. Accordingly, a light shielding layer 28 is to be provided so that light does not enter the contact holes 26, as indicated by the dashed lines. Also, spaces are formed within the contact holes 26, and accordingly stepped portions are formed on the surface of the active matrix substrate 101 that comes into contact with the liquid crystal layer 160. As a result, disturbance in alignment of the liquid crystal layer 160 occurs more readily.

For example, in a case of assuming that the size of a pixel is 10 μm×30 μm, the aperture ratio of the pixels provided with the light shielding layer 28 illustrated in FIG. 5 is around 35%. Conversely, according to the active matrix substrate 101 of the present embodiment, there is no light shielding layer covering the contact holes 26, and light can be transmitted through the contact holes 26 as well, and accordingly the aperture ratio is around 45% or higher.

Thus, according to the present embodiment, a liquid crystal display device with high resolution and high luminance can be realized.

Figure 7A:
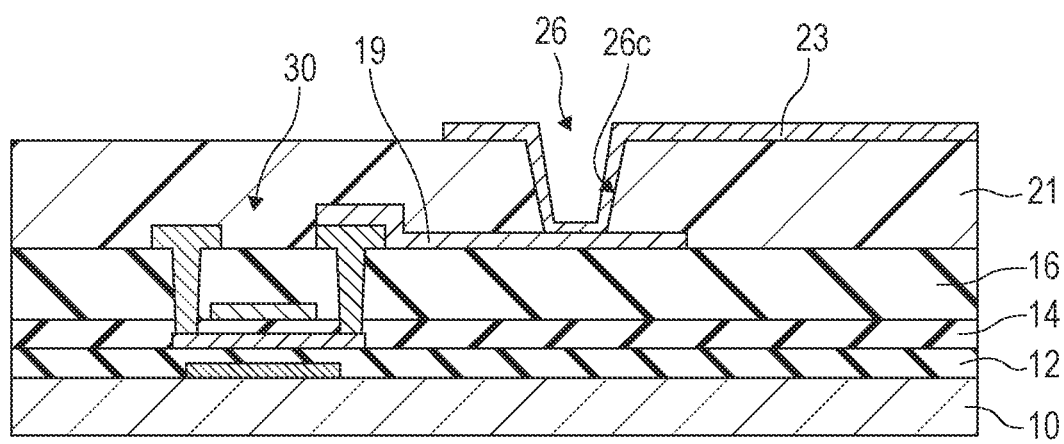
FIG. 7A is a process sectional view of part of the method for manufacturing an active matrix substrate according to the first embodiment.
Figure 7B:
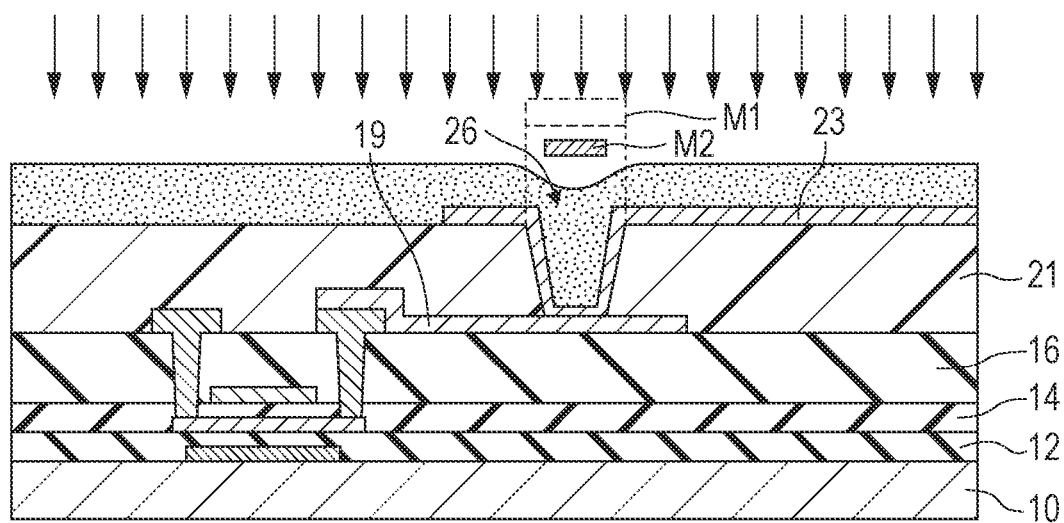
FIG. 7B is a process sectional view of part of the method for manufacturing an active matrix substrate according to the first embodiment.
Figure 7C:
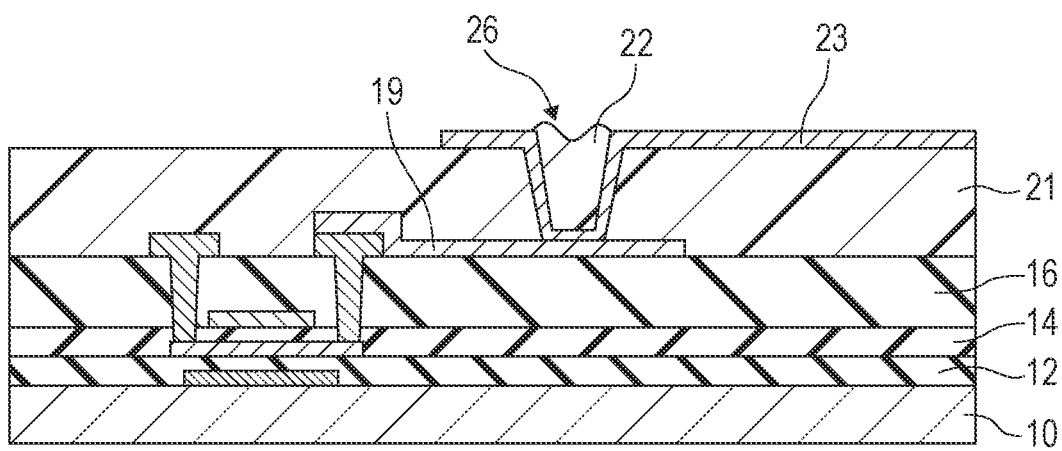
FIG. 7C is a process sectional view of part of the method for manufacturing an active matrix substrate according to the first embodiment.

Next, an example of a method for manufacturing an active matrix substrate according to the present embodiment will be described. FIG. 6 is a flowchart showing the method for manufacturing an active matrix substrate. Also, FIGS. 7A to 7C are process sectional views of part of the method for manufacturing an active matrix substrate according to the present embodiment.

The method for manufacturing an active matrix substrate according to the present embodiment includes (1) a process of forming the TFT (S1), (2) a process of forming the first color filter layer that has the contact hole (S2), (3) a process of forming the pixel electrode (S3), and (4) a process of forming the second color filter layer (S4). The method for manufacturing an active matrix substrate according to the present embodiment further includes (5) a process of forming the common electrode (S5). The substrate 10 has the plurality of pixel regions PR, and the active matrix substrate 101 having the plurality of pixels Px positioned at the respective plurality of pixel regions PR can be fabricated by performing the following processes in each pixel region PR. Each of the processes will be described in detail below, with reference to FIGS. 3, 4, 6, and 7A to 7C.

(1) Process of Forming TFT (S1)

First, the substrate 10 that is transparent and is made of glass, is prepared. An electroconductive film (e.g., tungsten (W) (50 nm)) is formed on the substrate 10, and the electroconductive film is patterned by a photolithography process, thereby forming the light shielding layer 11. Thereafter, the first insulating layer 12 (e.g., a laminated structure of silicon dioxide (SiO$_2$) (100 nm)/silicon nitride (SiN) (70 nm)) is formed on the substrate 10, so as to cover the light shielding layer 11.

Next, a semiconductor film (e.g., an oxide semiconductor including at least one of In, Ga, and Zn (50 nm)), is formed on the first insulating layer 12, and the semiconductor film is patterned by a photolithography process, thereby forming the semiconductor layer 13.

The gate insulating layer 14 (e.g., SiO$_2$ (85 nm)) is formed on the first insulating layer 12, so as to cover the semiconductor layer 13.

An electroconductive film (e.g., a laminated structure of Ti (100 nm)/Al (150 nm)/Ti (30 nm)) is formed on the gate insulating layer 14 and patterned, thereby forming the gate bus line GL including the gate electrode 15.

The second insulating layer 16 (e.g., SiO$_2$ (500 nm)) is formed on the gate insulating layer 14, so as to cover the gate bus line GL, and part of the second insulating layer 16 is etched, thereby forming the contact hole 16h in which the semiconductor layer 13 is exposed at the bottom face thereof in the second insulating layer 16.

Next, an electroconductive film (e.g., a laminated structure of Ti (60 nm)/Al (300 nm)/Ti (20 nm)) is formed in the contact hole 16h and on the second insulating layer 16, and is patterned, thereby forming the source electrode 17, the source bus line SL that is integrally formed with the source electrode 17, and the drain electrode 18. Thus, the TFT 30 is completed. Further, a transparent electroconductive film (e.g., indium zinc oxide (IZO) (100 nm)) is formed on the second insulating layer 16, so as to cover the source bus line SL, the source electrode 17, and the drain electrode 18, and patterned, thereby forming the lead-out electrode 19.

(2) Process of Forming First Color Filter Layer Having Contact Hole (S2)

The first color filter layer 21 having the contact hole 26 is formed, so as to cover the TFT 30. A first color filter film (e.g., photosensitive color resin (1000 nm)) is formed on the second insulating layer 16, so as to cover the lead-out electrode 19 and the TFT 30, and the first color filter film is patterned by a photolithography process, thereby forming the first color filter layer 21 that has the contact hole 26. This process (S2) is repeated, using blue photosensitive color resin for formation of the first color filter layer 21 of the first pixel Px1, green photosensitive color resin for formation of the first color filter layer 21 of the second pixel Px2, and red photosensitive color resin for formation of the first color filter layer 21 of the third pixel Px3, thereby forming the first color filter layer 21 of blue, green, and red, in the respective first pixel Px1, second pixel Px2, and third pixel Px3.

(3) Process of Forming Pixel Electrode (S3)

The pixel electrode 23 is formed on the side face 26c and the bottom face of the contact hole 26, and on the first color filter layer 21. A transparent electroconductive film (e.g., IZO (100 nm)) is formed on the side face 26c and the bottom face of the contact hole 26, and on the first color filter layer 21, and the transparent electroconductive film is patterned by a photolithography process, thereby forming the pixel electrode 23 as illustrated in FIG. 7A.

(4) Process of Forming Second Color Filter Layer (S4)

The second color filter layer 22 is formed within the contact hole 26. A second color filter film (e.g., photosensitive color resin (1000 nm)) is formed on the first color filter layer 21, so as to cover the contact hole 26 and the pixel electrode 23, and developing is performed by a photolithography process such that the second color filter layer 22 remains only within the contact hole 26. At this time, a mask pattern M2 used for exposing (indicated by arrows) of the second color filter film may be smaller than a mask pattern M1 (indicated by dashed lines) used for forming the contact hole, as illustrated in FIG. 7B. This can suppress the situation in which the second color filter layer 22 that remains from developing spreads outside from the contact hole 26, resulting in the second color filter layer 22 protruding out or becoming raised up above the contact hole 26, as illustrated in FIG. 7C.

In the same way as in process S2, this process (S4) is repeated, using blue photosensitive color resin for formation of the second color filter layer 22 of the first pixel Px1 (FIG. 3), green photosensitive color resin for formation of the second color filter layer 22 of the second pixel Px2, and red photosensitive color resin for formation of the second color filter layer 22 of the third pixel Px3, thereby forming the second color filter layer 22 of blue, green, and red, in the respective first pixel Px1, second pixel Px2, and third pixel Px3.

(5) Process of Forming Common Electrode (S5)

The third insulating layer 24 (e.g., SiN (100 nm)) is formed on the first color filter layer 21, so as to cover the pixel electrode 23 and the second color filter layer 22. Further, a transparent electroconductive film (e.g., IZO (100 nm)) is formed on the third insulating layer 24, and patterned by a photolithography process, thereby forming the common electrode 25. Thereafter, an alignment film is formed on the third insulating layer 24, so as to cover the common electrode 25. Thus, the active matrix substrate 101 is complete.

In a case of fabricating a liquid crystal display device, a light shielding film (e.g., a light shielding resin film 1000 nm thick) is formed on the counter substrate 150 made of a transparent material such as glass or the like, separate from the above, and is patterned by a photolithography process, thereby forming a black matrix. Further, a photospacer (PS) is formed on the black matrix. The black matrix may be formed on the active matrix substrate 101. For example, the black matrix may be formed on the common electrode 25.

Thereafter, the counter substrate 150 and the active matrix substrate 101 are applied to each other by the seal 180, and liquid crystal is injected therein, thereby forming the liquid crystal layer 160. Further, the substrates that are applied to each other are segmented, thereby completing a liquid crystal panel. Moreover, the liquid crystal panel is sandwiched by the pair of polarizing plates 170, thereby completing the liquid crystal display device.

Note that in a case in which increasing the smoothness on the surface of the active matrix substrate 101 is desirable, due to stepped portions being formed, such as the second color filter layer 22 being raised up in the contact hole 26 or the like, an etch-back process may be further included in the formation of the second color filter layer 22.

Figure 8A:
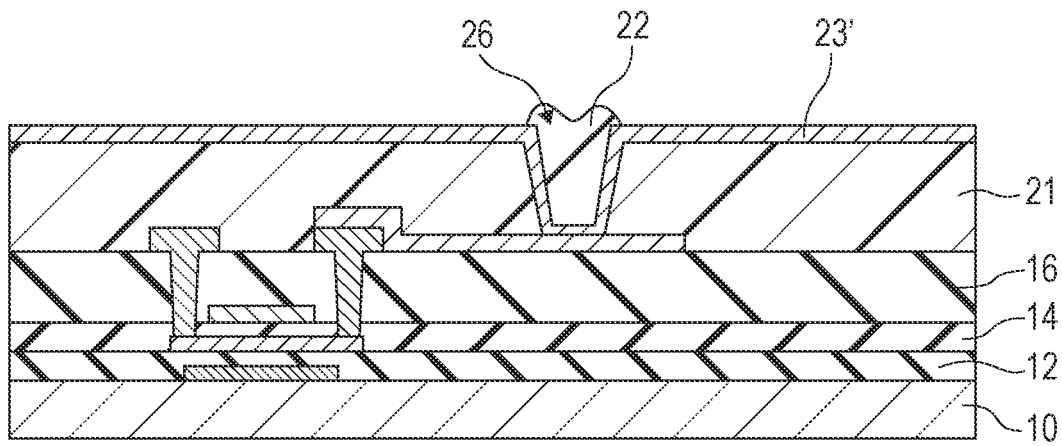
FIG. 8A is a process sectional view of part of the method for manufacturing an active matrix substrate according to the first embodiment.
Figure 8B:
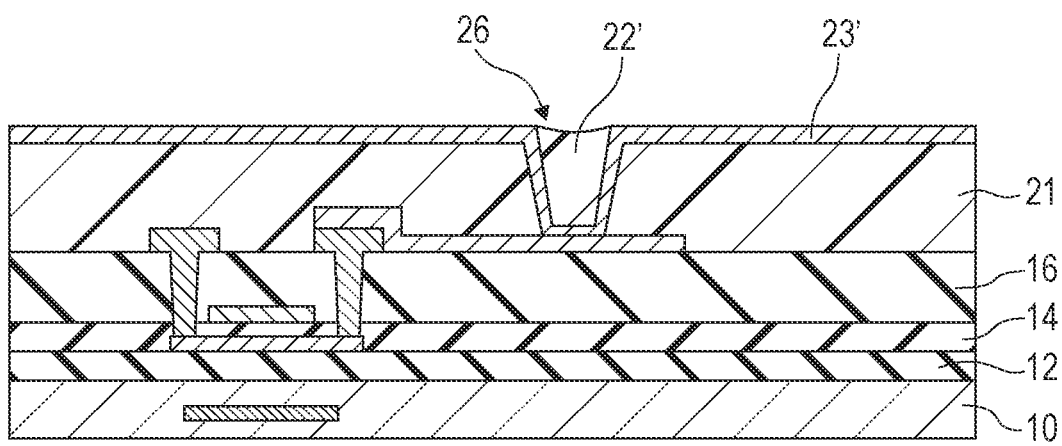
FIG. 8B is a process sectional view of part of the method for manufacturing an active matrix substrate according to the first embodiment.

For example, as illustrated in FIG. 8A, a pixel electrode 23' that covers the entirety of the first color filter layer 21 may be formed in process (S3). Next, the second color filter layer 22 is formed within the contact hole 26, in accordance with process S4. Subsequently, at least part of the second color filter layer 22 within the contact hole 26 may be removed by dry etching. For example, part of the second color filter layer 22 is removed by dry etching using a gas including $O_2$. The first color filter layer 21 is covered by the pixel electrode 23', and the pixel electrode 23' is hardly etched under the above-described dry etching conditions. Thus, etching back part of the second color filter layer 22 enables a second color filter layer 22' with smaller stepped portions to be formed, as illustrated in FIG. 8B.

In this way, according to the method for manufacturing an active matrix substrate of the present embodiment, the second color filter layer 22 is disposed in the contact hole 26, and an active matrix substrate 101 and a liquid crystal display device 201 can be manufactured in which light can be transmitted through the region of the contact hole 26 as well.

Second Embodiment

Figure 9:
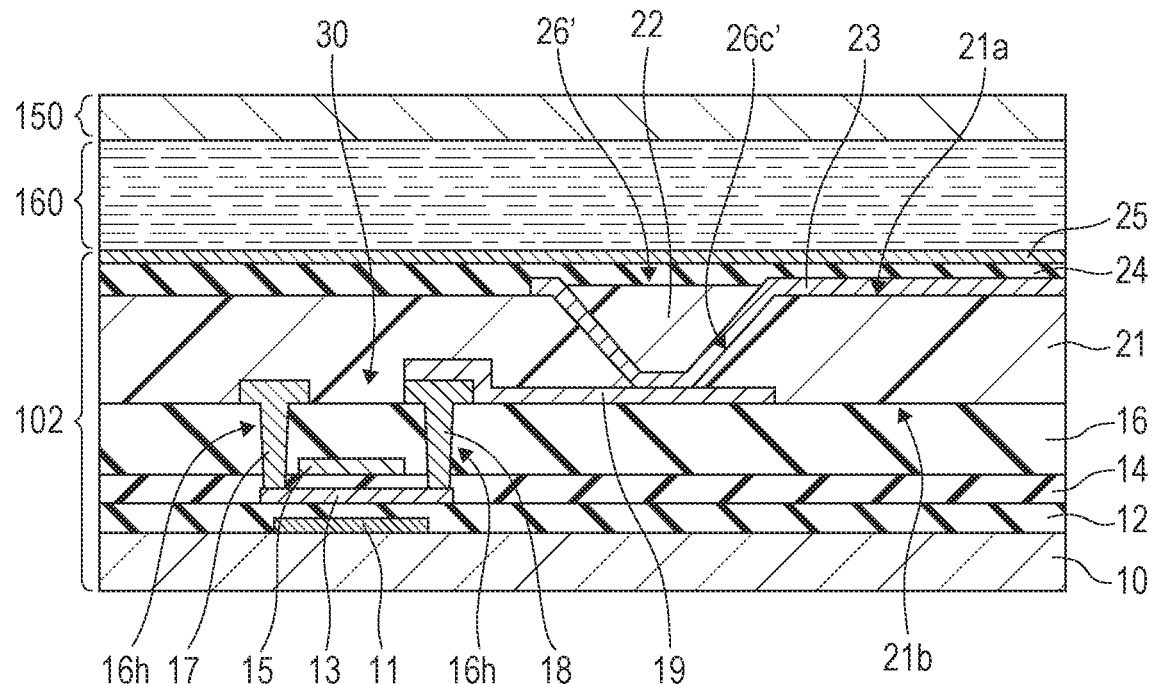
FIG. 9 is a sectional view of a liquid crystal display device according to a second embodiment.

An active matrix substrate and a liquid crystal display device according to a second embodiment differ from the active matrix substrate and the liquid crystal display device according to the first embodiment with respect to the shape of the contact hole. In an active matrix substrate 102 according to the present embodiment that is illustrated in FIG. 9, a contact hole 26' may have a side face 26c' that is inclined at an angle of 45° or less as to the principal face of the substrate 10. Inside of the contact hole 26' is more readily filled with the second color filter layer 22 due to the inclination angle of the side face being 45° or less. Also, the second color filter layer 22 disposed within the contact hole 26' tends to rise up less. Accordingly, stepped portions on a surface of the active matrix substrate 102 can be made to be smaller and smoothness can be increased more readily.

Reducing the inclination angle of the side face 26c' increases the opening area of the contact hole 26' on the upper face 21a of the first color filter layer 21. However, the contact hole 26' transmits light, and accordingly increase in the area of the contact hole 26' does not lead to reduction in the pixel aperture ratio.

The contact hole 26' having such a shape can be formed by performing formation of the contact hole 26' through a separate process from the patterning of the first color filter layer 21, for example. In process (S2) in the first embodiment, the first color filter film is first patterned by the photolithography process, thereby forming the first color filter layer 21. Thereafter, the contact hole 26' may be formed by forming a mask having an opening that defines the contact hole 26' on the first color filter layer 21, and etching part of the first color filter layer 21 using this mask by isotropic etching or under etching conditions of an etch rate that is greater in the lateral direction than in a vertical direction. Dry etching or wet etching may be used for the etching.

Third Embodiment

An active matrix substrate and a liquid crystal display device according to a third embodiment differ from the active matrix substrate and the liquid crystal display device according to the first embodiment with respect to the point of the active matrix substrate further including a planarization layer.

Figure 10:
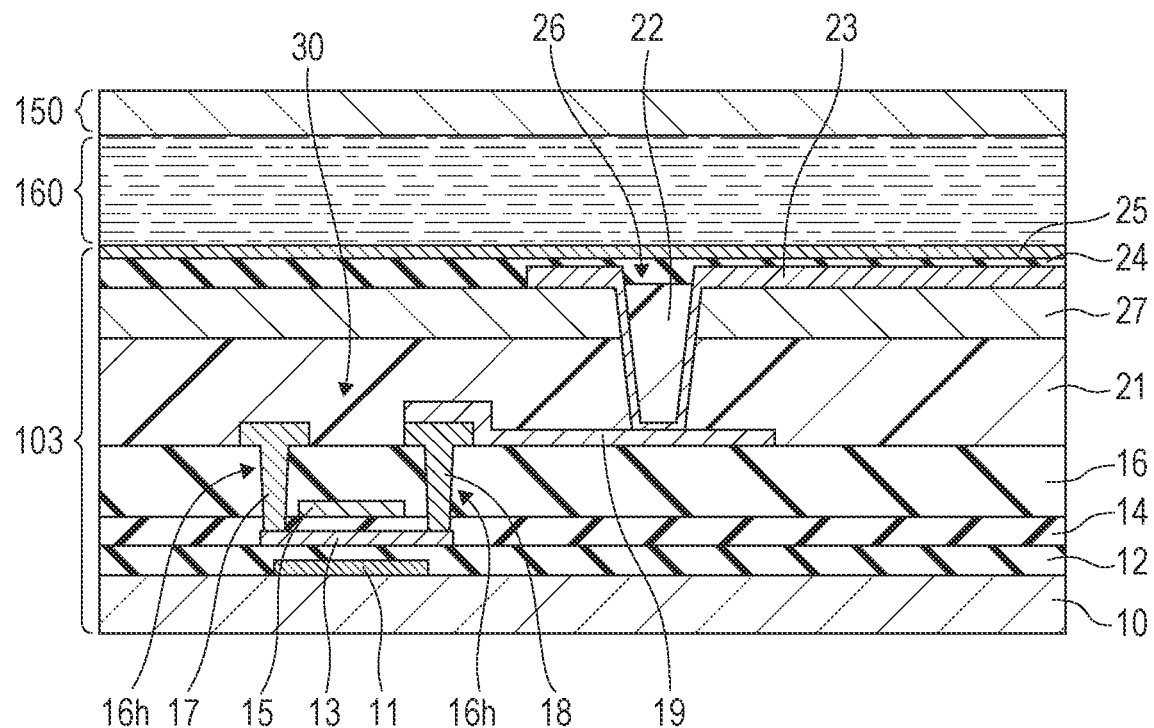
FIG. 10 is a sectional view of a liquid crystal display device according to a third embodiment.

An active matrix substrate 103 according to the third embodiment that is illustrated in FIG. 10 may further include a planarization layer 27 positioned between the pixel electrode 23 and the first color filter layer 21, in each pixel Px. The contact hole 26 may pass through the planarization layer 27 and the first color filter layer 21.

The first color filter layer 21 and the second color filter layer 22 tend to not be smooth but rather exhibit surface roughness, due to the nature of the material. Accordingly, there is a possibility that forming the pixel electrode 23 on the first color filter layer 21 that is not flat will result in an uneven cell gap when the counter substrate and the active matrix substrate are applied to each other, and that display quality will deteriorate.

According to the active matrix substrate 103 of the present embodiment, the planarization layer 27 covers the first color filter layer 21, and accordingly the base on which the pixel electrode 23 is formed can be planarized, and deterioration in display quality can be suppressed.

In a case of manufacturing the active matrix substrate 103, up to process (S4) is performed in the same way as with the active matrix substrate according to the first embodiment, and the first color filter layer 21 that has the contact hole 26 is formed, following which the planarization layer 27 is formed, and the contact hole 26 is formed in the planarization layer 27 at the same position as the contact hole 26 formed in the first color filter layer 21.

Alternatively, in process (S4), the first color filter layer 21 is first formed without contact holes 26 in the first pixel Px1, the second pixel Px2, and the third pixel Px3. Thereafter, the planarization layer 27 may be formed, and contact holes 26 that pass through both the planarization layer 27 and the first color filter layer 21 may be formed by etching.

After forming the contact hole 26 in the planarization layer 27, the active matrix substrate 103 can be manufactured by the same processes as with the first embodiment.

Fourth Embodiment

An active matrix substrate and a liquid crystal display device according to a fourth embodiment differ from the active matrix substrate and the liquid crystal display device according to the first embodiment with respect to the point of the contact hole being positioned above the TFT.

Figure 11:
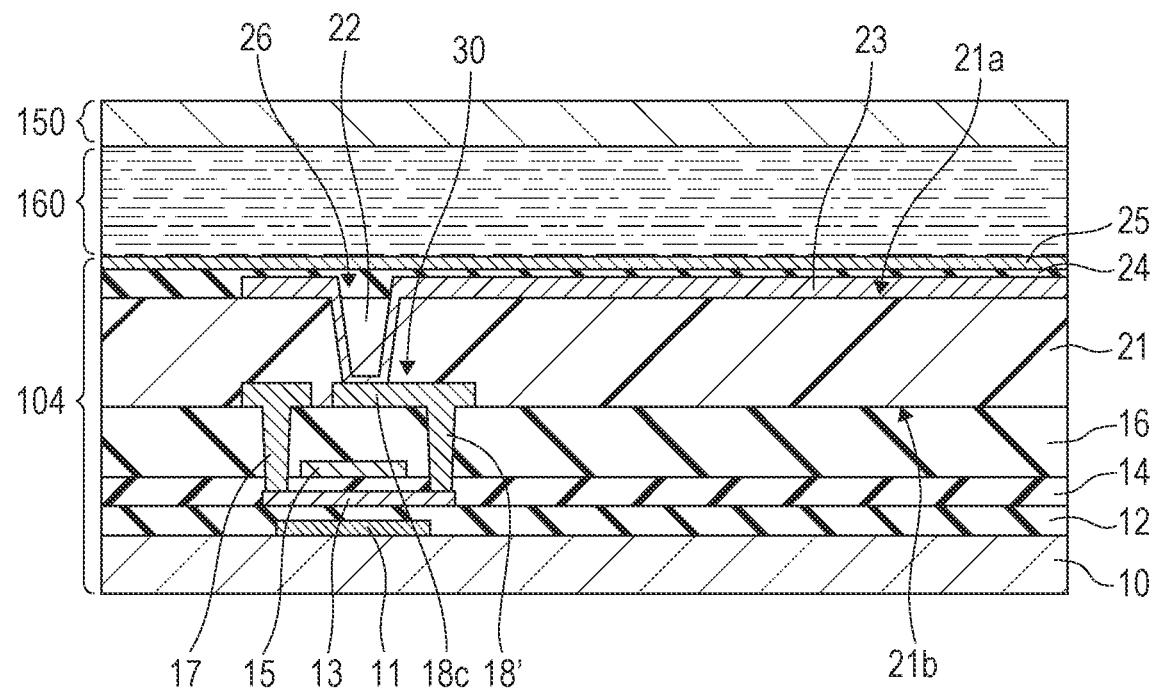
FIG. 11 is a sectional view of a liquid crystal display device according to a fourth embodiment.

In an active matrix substrate 104 according to the present embodiment that is illustrated in FIG. 11, a drain electrode 18' of the TFT 30 may have a portion 18c that is positioned on the second insulating layer 16 and that is led into the TFT 30 so as to overlap the gate electrode 15 in plan view.

The contact hole 26 may be positioned above the TFT 30 in plan view, and the pixel electrode 23 may come into contact with and be electrically connected to the portion 18c of the drain electrode 18' via the contact hole 26.

In the active matrix substrate 104, light does not enter the contact hole 26, due to the light shielding layer 11 positioned below the TFT 30. On the other hand, even in a case in which the position of forming the contact hole 26 is greatly deviated from the designed position due to misalignment, and the contact hole 26 is positioned outside of the region above the light shielding layer 11, leakage of light in the contact hole 26 is suppressed in the same way as described in the first embodiment.

Thus, according to the active matrix substrate 104, deterioration in manufacturing yield due to positional deviation at the time of forming the contact hole 26 can be suppressed.

Fifth Embodiment

In the first embodiment, the first color filter layer 21 and the second color filter layer 22 have the same spectroscopic characteristics in the same pixel. Conversely, in an active matrix substrate and a liquid crystal display device according to a fifth embodiment, a pixel exists in which the first color filter layer 21 and the second color filter layer 22 have different spectroscopic characteristics in the same pixel.

Figure 12A:
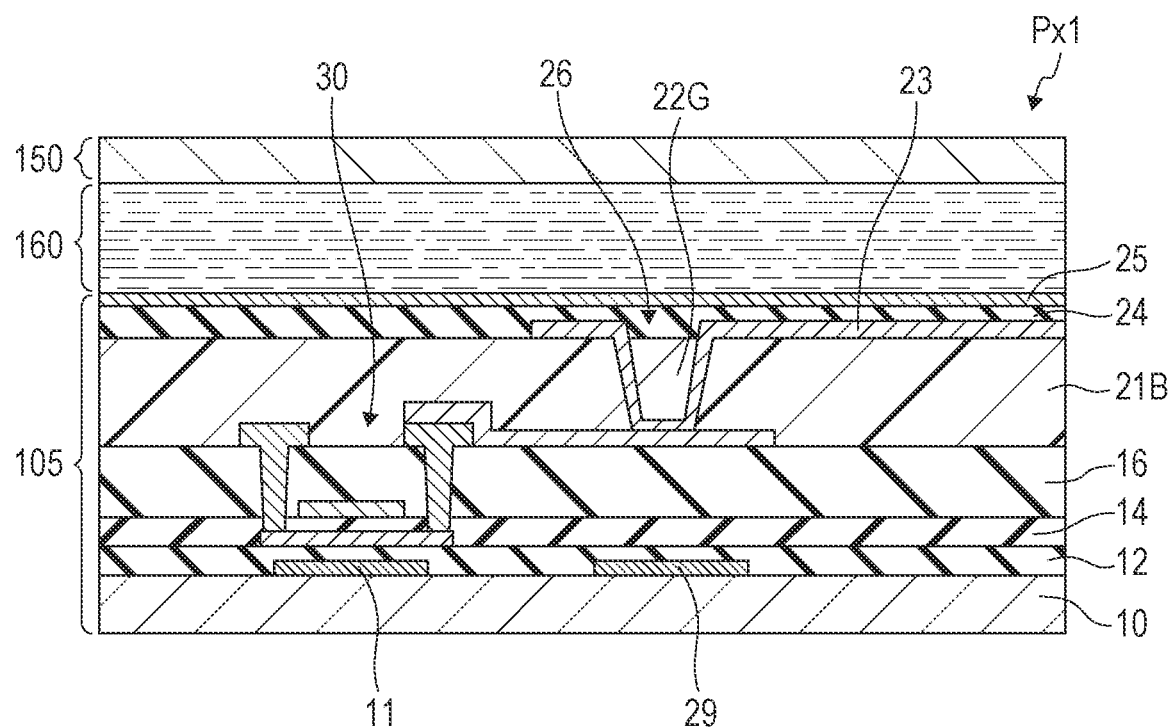
FIG. 12A is a sectional view of a liquid crystal display device according to a fifth embodiment.
Figure 12B:
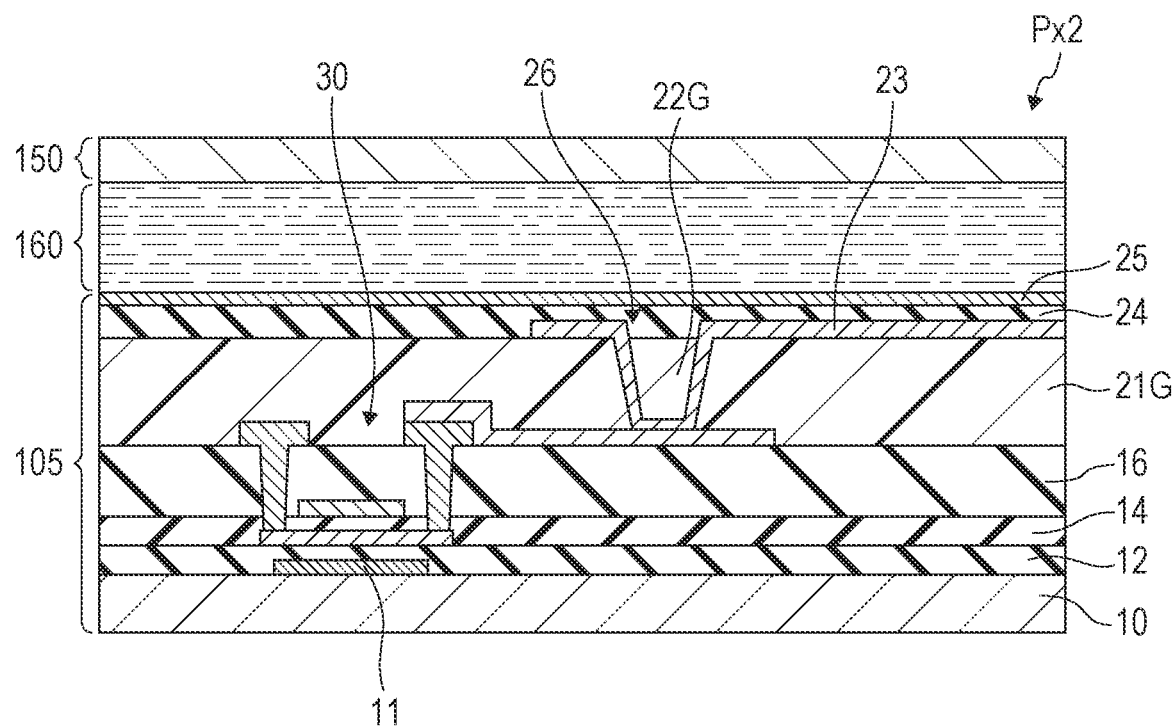
FIG. 12B is a sectional view of the liquid crystal display device according to the fifth embodiment.
Figure 12C:
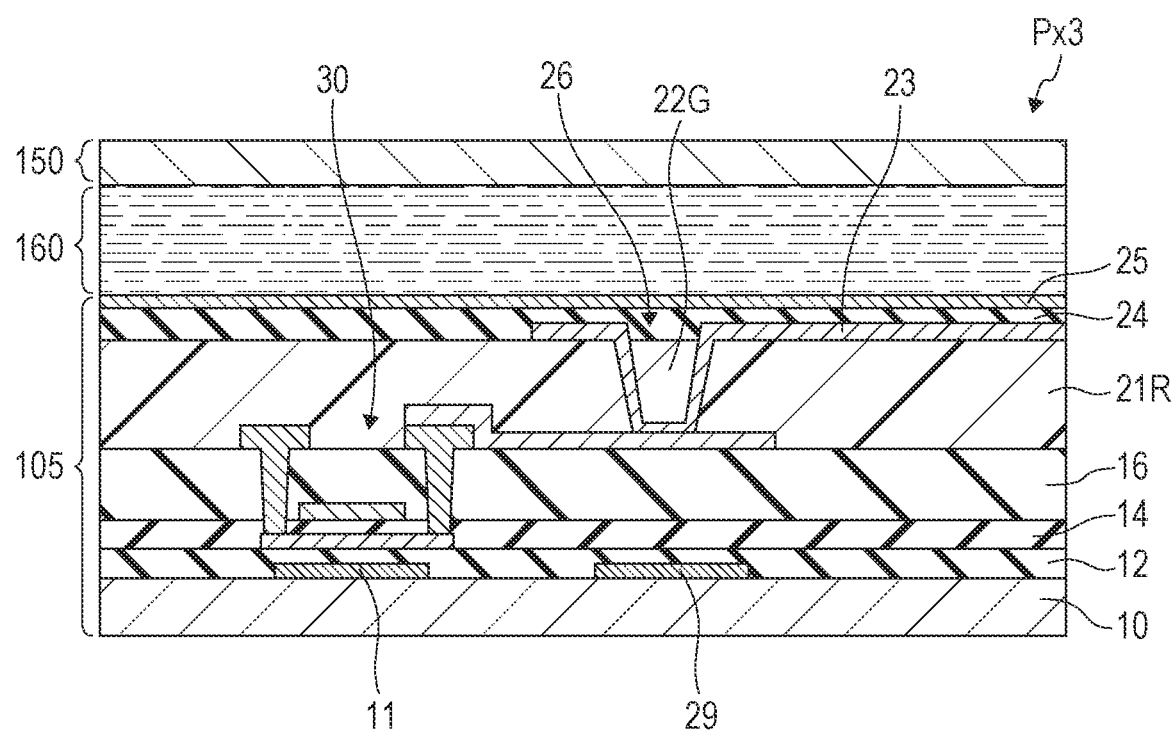
FIG. 12C is a sectional view of the liquid crystal display device according to the fifth embodiment.

FIGS. 12A, 12B, and 12C are sectional views of the first pixel Px1, the second pixel Px2, and the third pixel Px3 of an active matrix substrate 105 according to the present embodiment. For the sake of facilitating understanding, in FIGS. 12A, 12B, and 12C, the first wavelength band, the second wavelength band, and the third wavelength band are respectively taken as a blue band B, a green band G, and a red band R, and these letters are appended to the reference symbols. For example, the first color filter layer 21 that passes the first wavelength band in the first pixel Px1 is denoted by "21B". Note however, that the correlation among the first wavelength band, the second wavelength band, and the third wavelength band, and the blue band B, the green band G, and the red band R is not limited to this relation, and an arrangement may be made in which the first wavelength band is the red band, or the like.

In the first pixel Px1, the first color filter layer 21B may transmit light of the first wavelength band, and the second color filter layer 22G may transmit light of the second wavelength band. In the second pixel Px2, the first color filter layer 21G and the second color filter layer 22G may transmit light of the second wavelength band. Also, in the third pixel Px3, the first color filter layer 21R may transmit light of the third wavelength band, and the second color filter layer 22G may transmit light of the second wavelength band.

The color of the filters of the first color filter layer 21G and the second color filter layer 22G is the same in the second pixel Px2, but the colors of the filters of the first color filter layer 21 and the second color filter layer 22 differ from each other in the first pixel Px1 and the third pixel Px3. It is undesirable for the contact hole 26 to transmit light in such pixels, and accordingly the first pixel Px1 and the third pixel Px3 may further include a light shielding layer 29 positioned below the contact hole 26.

According to the active matrix substrate 105 of the present embodiment, the second color filter layer 22 of the same spectroscopic characteristics is disposed in the plurality of types of pixels, and accordingly, the pixel aperture ratio can be increased in one type out of the plurality of types of pixels, as described in the first embodiment. On the other hand, only one type of second color filter layer 22 formed in the contact hole 26 is used, and accordingly the number of processes for forming the second color filter layer 22 can be reduced in comparison with the first embodiment, and manufacturing costs can be reduced.

Sixth Embodiment

An active matrix substrate and a liquid crystal display device according to a sixth embodiment differ from the active matrix substrate and the liquid crystal display device according to the first embodiment with respect to the point of a blue second color filter layer being formed in different types of pixels.

Figure 13A:
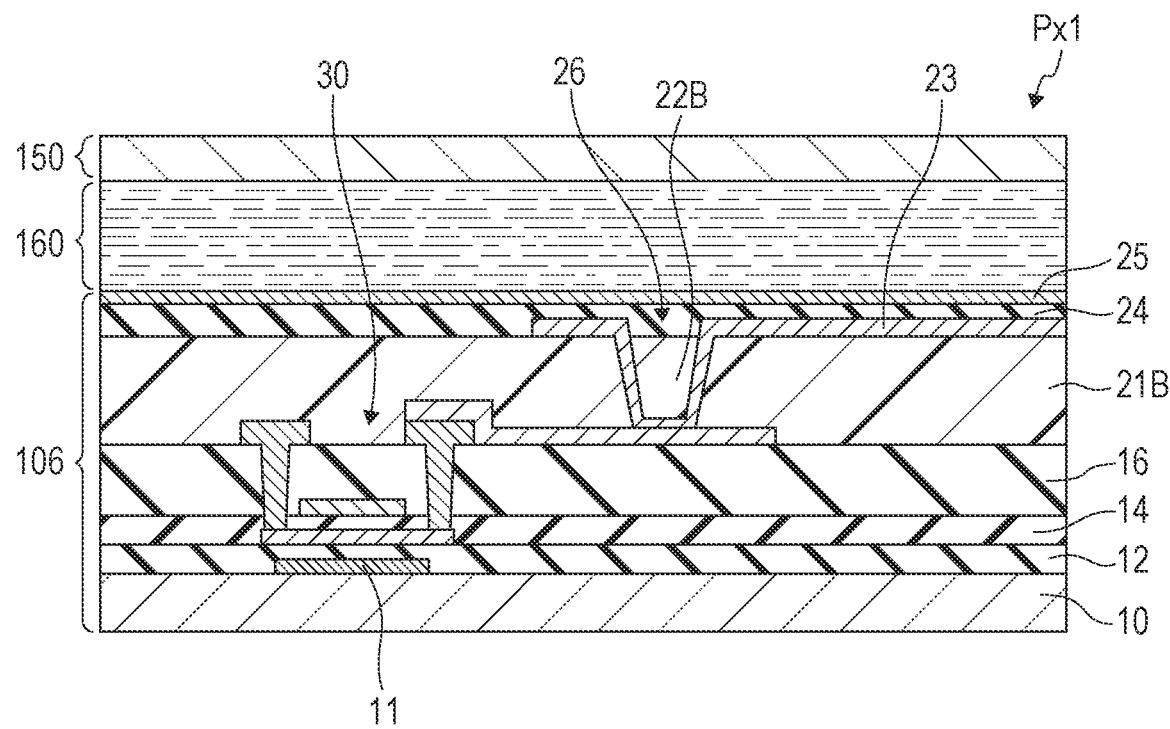
FIG. 13A is a sectional view of a liquid crystal display device according to a sixth embodiment.
Figure 13B:
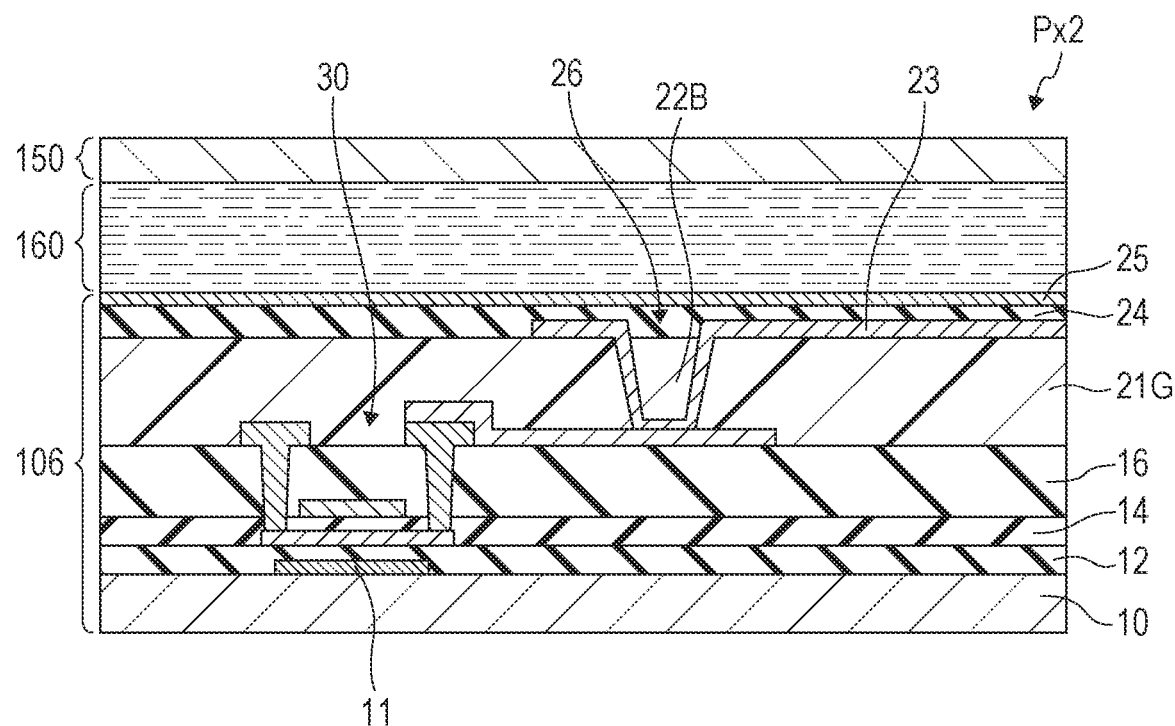
FIG. 13B is a sectional view of the liquid crystal display device according to the sixth embodiment.
Figure 13C:
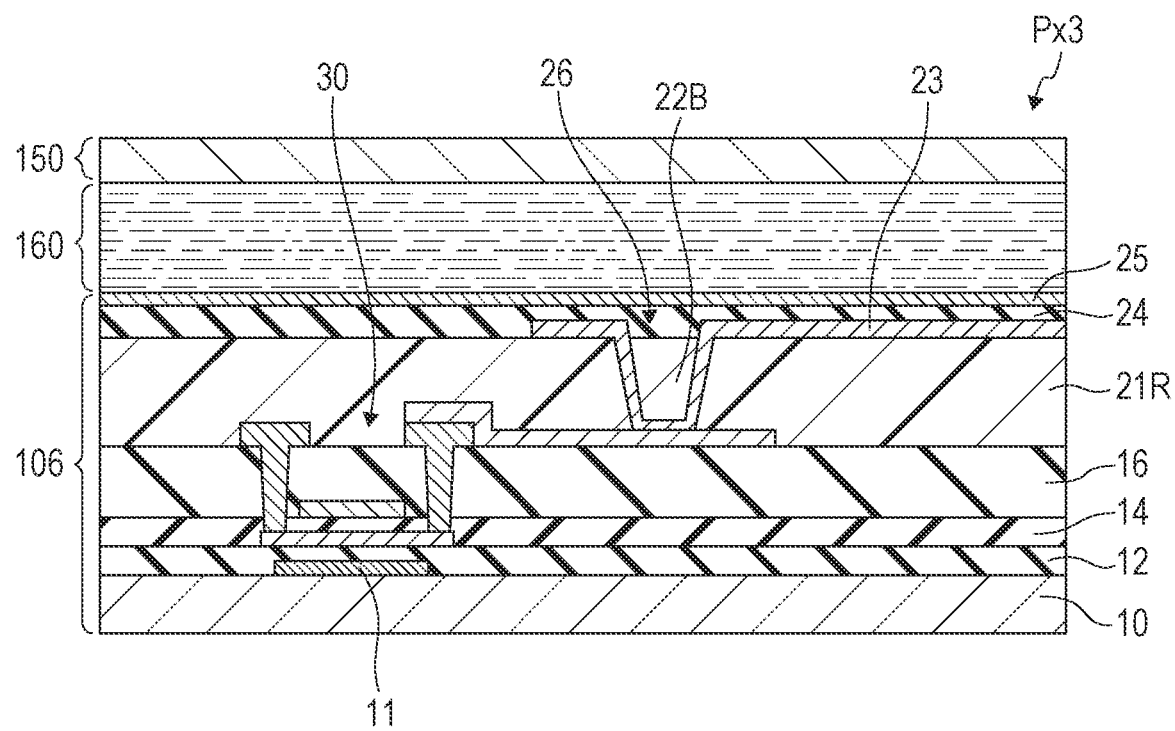
FIG. 13C is a sectional view of the liquid crystal display device according to the sixth embodiment.

FIGS. 13A, 13B, and 13C are sectional views of the first pixel Px1, the second pixel Px2, and the third pixel Px3 of an active matrix substrate 106 according to the present embodiment. In the same way as in the fifth embodiment, in FIGS. 13A, 13B, and 13C, the filter transmitting blue, the filter transmitting green, and the filter transmitting red, are denoted by reference symbols appended by the letters B, G, and R, respectively. In the first pixel Px1, the first color filter layer 21B and the second color filter layer 22B may transmit light of the blue wavelength band. In the second pixel Px2, the first color filter layer 21G may transmit light of the green wavelength band and the second color filter layer 22B may transmit light of the blue wavelength band. In the third pixel Px3, the first color filter layer 21R may transmit light of the red wavelength band and the second color filter layer 22B may transmit light of the blue wavelength band.

Also, in the present embodiment, each of the first pixel Px1, the second pixel Px2, and the third pixel Px3 does not have a light shielding layer below the contact hole 26.

According to the active matrix substrate 106 of the present embodiment, the first color filter layer 21 and the second color filter layer 22 of the same spectroscopic characteristics are disposed in the first pixel Px1, and accordingly, the pixel aperture ratio can be increased as described in the first embodiment.

On the other hand, in the second pixel Px2 and the third pixel Px3, the spectroscopic characteristics of the first color filter layer and the second color filter layer differ from each other. However, transmissivity of blue filters is generally low, and accordingly effects of color shift at the second pixel Px2 (green pixel) and the third pixel Px3 (red pixel) are small in cases in which the area of the contact hole 26 is small. Hence, no light shielding layer has to be provided. For example, in a case in which the aperture area of each pixel is 4 μm×15 μm, and the area of the contact hole 26 is 2 μm×2

μm, the proportion of the contact hole 26 in the aperture is 6.7%. Thus, the deterioration of color gamut of the liquid crystal display device is no more than around 2% in terms of National Television System Committee (NTSC) ratio. On the other hand, only one type of second color filter layer 22 formed in the contact hole 26 is used as described in the fifth embodiment, and accordingly the number of processes for forming the second color filter layer 22 can be reduced in comparison with that in the first embodiment, and manufacturing costs can be reduced.

Other Embodiments

The active matrix substrate, the liquid crystal display device, and the method for manufacturing an active matrix substrate according to the present disclosure are not limited to the above embodiments, and various alterations may be made. For example, the above embodiments may be combined and carried out as appropriate. For example, the second embodiment and the third embodiment may be combined, or the third embodiment and the sixth embodiment may be combined, and be carried out. Also, although a lateral electric field mode liquid crystal display device is exemplified in the embodiments, the active matrix substrate and the like according to the present disclosure may be applied to a vertical electric field mode liquid crystal display device.

The active matrix substrate, the liquid crystal display device, and the method for manufacturing an active matrix substrate according to the present disclosure can also be explained as follows.

An active matrix substrate according to a first configuration includes a substrate that is transparent, and a plurality of pixels positioned on the substrate, wherein each pixel according to the first configuration includes a thin-film transistor (TFT) positioned on the substrate, a first color filter layer disposed on the substrate so as to cover the TFT, a contact hole being provided in the first color filter layer, a pixel electrode that is positioned on a bottom face and a side face of the contact hole, and on the first color filter layer, and that is electrically connected to the TFT via the contact hole, and a second color filter layer disposed within the contact hole. According to the first configuration, light passes through the contact hole, and accordingly the pixel aperture ratio can be increased.

According to a second configuration, in the first configuration each of the pixels may further include a planarization layer that is positioned between the pixel electrode and the first color filter layer, and the contact hole may pass through the planarization layer and the first color filter layer.

According to a third configuration, in the first or second configurations, in each of the pixels, the pixel electrode may cover an entirety of the first color filter layer.

According to a fourth configuration, in any one of the first to third configurations, the side face of the contact hole may be inclined at an angle of 45° or less as to a principal face of the substrate.

According to a fifth configuration, in any one of the first to fourth configurations, each of the pixels may include a lead-out electrode that is led to an outer side from the TFT, and that electrically connects the TFT and the pixel electrode, the first color filter layer may cover the TFT and the lead-out electrode, and the contact hole may be positioned on the lead-out electrode.

According to a sixth configuration, in any one of the first to fourth configurations, the contact hole may be positioned above the TFT.

According to a seventh configuration, in any one of the first to sixth configurations, the first color filter layer and the second color filter layer may transmit light of a same wavelength band.

According to an eighth configuration, in any one of the first to sixth configurations, the plurality of pixels may include a first pixel, a second pixel, and a third pixel, which are adjacent to one another, in the first pixel, the first color filter layer and the second color filter layer may transmit light of a first wavelength band, in the second pixel, the first color filter layer and the second color filter layer may transmit light of a second wavelength band, in the third pixel, the first color filter layer and the second color filter layer may transmit light of a third wavelength band, and the first wavelength band, the second wavelength band, and the third wavelength band may differ from one another.

According to a ninth configuration, in any one of the first to sixth configurations, the plurality of pixels may include a first pixel, a second pixel, and a third pixel, which are adjacent to one another, in the first pixel, the first color filter layer and the second color filter layer may transmit light of a first wavelength band, in the second pixel, the first color filter layer may transmit light of a second wavelength band and the second color filter layer transmit light of the first wavelength band, in the third pixel, the first color filter layer may transmit light of a third wavelength band and the second color filter layer transmit light of the first wavelength band, the first wavelength band, the second wavelength band, and the third wavelength band may differ from one another, and each of the second pixel and the third pixel may further include a light shielding layer that is positioned below the contact hole.

According to a tenth configuration, in any one of the first to sixth configurations, the plurality of pixels may include a first pixel, a second pixel, and a third pixel, which are adjacent to one another, in the first pixel, the first color filter layer and the second color filter layer may transmit light of a blue wavelength band, in the second pixel, the first color filter layer may transmit light of a green wavelength band and the second color filter layer transmit light of the blue wavelength band, in the third pixel, the first color filter layer may transmit light of a red wavelength band and the second color filter layer transmit light of the blue wavelength band, and each of the first pixel, the second pixel, and the third pixel may not have a light shielding layer below the contact hole.

According to an eleventh configuration, any one of the first to tenth configurations may further include an insulating film that is positioned on the substrate, so as to cover the pixel electrode, and a common electrode that is positioned on the insulating film.

A liquid crystal display device according to a twelfth configuration includes the active matrix substrate according to any one of the first to eleventh configurations, a counter substrate, and a liquid crystal layer that is positioned between the active matrix substrate and the counter substrate.

A method for manufacturing an active matrix substrate according to a thirteenth configuration includes a process (A) of forming a thin-film transistor (TFT), a process (B) of forming a first color filter layer that covers the TFT and that has a contact hole, a process (C) of forming a pixel electrode on a side face and a bottom face of the contact hole, and on the first color filter layer, and a process (D) of forming a second color filter layer within the contact hole, in which the active matrix substrate includes a substrate that is transparent and that has a plurality of pixel regions, and a plurality of pixels that are each positioned in a pixel region of the plurality of pixel regions, and the processes (A) to (D) are executed in each pixel region.

According to a fourteenth configuration, in the thirteenth configuration, the process (D) may include a process of forming a second color filter film so as to cover an inside of the contact hole and cover the first color filter layer, and a process of forming the second color filter layer, by shaping the second color filter film by using a mask pattern that is smaller than a mask pattern used for forming the contact hole in the process (B).

According to a fifteenth configuration, in the thirteenth or fourteenth configurations, the pixel electrode may cover an entirety of the first color filter layer in the process (C), and the process (D) may include a process of removing at least part of the second color filter layer within the contact hole by etching.

According to a sixteenth configuration, in any one of the thirteenth to fifteenth configurations, the process (B) may include a process of forming, on the first color filter layer, a mask having an opening that defines the contact hole, and a process of etching part of the first color filter layer by using the mask, by isotropic etching or under etching conditions of an etch rate that is greater in a lateral direction than in a vertical direction.

The active matrix substrate, the liquid crystal display device, and the method for manufacturing an active matrix substrate, according to the present disclosure, are applicable to liquid crystal display devices of various usages.

The present disclosure contains subject matter related to that disclosed in Japanese Priority Patent Application JP 2022-080584 filed in the Japan Patent Office on May 17, 2022, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An active matrix substrate, comprising:
   a substrate that is transparent; and
   a plurality of pixels positioned on the substrate, wherein each of the plurality of pixels includes:
      a thin-film transistor (TFT) positioned on the substrate,
      a first color filter layer disposed on the substrate so as to cover the TFT, a contact hole being provided in the first color filter layer,
      a pixel electrode that is positioned on a bottom face and a side face of the contact hole, and on the first color filter layer, and that is electrically connected to the TFT via the contact hole, and
      a second color filter layer disposed within the contact hole,
   wherein
   the plurality of pixels includes a first pixel, a second pixel, and a third pixel, which are adjacent to one another,
   in the first pixel, the first color filter layer and the second color filter layer transmit light of a first wavelength band,
   in the second pixel, the first color filter layer transmits light of a second wavelength band,
   the second color filter layer transmits the light of the first wavelength band,
   in the third pixel, the first color filter layer transmits light of a third wavelength band, and the second color filter layer transmits the light of the first wavelength band, the first wavelength band, the second wavelength band, and the third wavelength band differ from one another, and each of the second pixel and the third pixel includes a light shielding layer that is positioned below the contact hole.

2. The active matrix substrate according to claim 1, wherein
   each of the plurality of pixels further includes:
      a planarization layer that is positioned between the pixel electrode and the first color filter layer, and
   the contact hole passes through the planarization layer and the first color filter layer.

3. The active matrix substrate according to claim 1, wherein, in each of the plurality of pixels, the pixel electrode covers an entirety of the first color filter layer.

4. The active matrix substrate according to claim 1, wherein the side face of the contact hole is inclined at an angle of 45° or less as to a principal face of the substrate.

5. The active matrix substrate according to claim 1, wherein
   each of the plurality of pixels further includes a lead-out electrode that is led to an outer side from the TFT, and that electrically connects the TFT and the pixel electrode,
   the first color filter layer covers the TFT and the lead-out electrode, and
   the contact hole is positioned on the lead-out electrode.

6. The active matrix substrate according to claim 1, wherein the contact hole is positioned above the TFT.

7. The active matrix substrate according to claim 1, further comprising:
   an insulating film that is positioned on the substrate, so as to cover the pixel electrode; and
   a common electrode that is positioned on the insulating film.

8. A liquid crystal display device, comprising:
   the active matrix substrate according to claim 1;
   a counter substrate; and
   a liquid crystal layer that is positioned between the active matrix substrate and the counter substrate.

9. An active matrix substrate, comprising:
   a substrate that is transparent; and
   a plurality of pixels positioned on the substrate, wherein each of the plurality of pixels includes:
      a thin-film transistor (TFT) positioned on the substrate,
      a first color filter layer disposed on the substrate so as to cover the TFT, a contact hole being provided in the first color filter layer,
      a pixel electrode that is positioned on a bottom face and a side face of the contact hole, and on the first color filter layer, and that is electrically connected to the TFT via the contact hole, and
      a second color filter layer disposed within the contact hole,
   wherein
   the plurality of pixels includes a first pixel, a second pixel, and a third pixel, which are adjacent to one another,
   in the first pixel, the first color filter layer and the second color filter layer transmit light of a blue wavelength band, in the second pixel, the first color filter layer transmits light of a green wavelength band, and the second color filter layer transmits the light of the blue wavelength band, in the third pixel, the first color filter layer transmits light of a red wavelength band, and the second color filter layer transmits the light of the blue wavelength band, and each of the first pixel, the second pixel, and the third pixel does not have a light shielding layer below the contact hole.

10. The active matrix substrate according to claim 9, wherein each of the plurality of pixels further includes:
a planarization layer that is positioned between the pixel electrode and the first color filter layer, and
the contact hole passes through the planarization layer and the first color filter layer.

11. The active matrix substrate according to claim 9, wherein, in each of the plurality of pixels, the pixel electrode covers an entirety of the first color filter layer.

12. The active matrix substrate according to claim 9, wherein the side face of the contact hole is inclined at an angle of 45° or less as to a principal face of the substrate.

13. The active matrix substrate according to claim 9, wherein each of the plurality of pixels further includes a lead-out electrode that is led to an outer side from the TFT, and that electrically connects the TFT and the pixel electrode, the first color filter layer covers the TFT and the lead-out electrode, and the contact hole is positioned on the lead-out electrode.

14. The active matrix substrate according to claim 9, wherein the contact hole is positioned above the TFT.

15. The active matrix substrate according to claim 9, further comprising:
an insulating film that is positioned on the substrate, so as to cover the pixel electrode; and
a common electrode that is positioned on the insulating film.

16. A liquid crystal display device, comprising:
the active matrix substrate according to claim 9;
a counter substrate; and
a liquid crystal layer that is positioned between the active matrix substrate and the counter substrate.

* * * * *